US011575581B2

(12) United States Patent
Sidebottom

(10) Patent No.: US 11,575,581 B2
(45) Date of Patent: *Feb. 7, 2023

(54) UTILIZING CONSTRAINTS TO DETERMINE OPTIMIZED NETWORK PLANS AND TO IMPLEMENT AN OPTIMIZED NETWORK PLAN

(71) Applicant: Juniper Networks, Inc., Sunnyvale, CA (US)

(72) Inventor: Greg Sidebottom, Ottawa (CA)

(73) Assignee: Juniper Networks, Inc., Sunnyvale, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 17/247,760

(22) Filed: Dec. 22, 2020

(65) Prior Publication Data

US 2021/0144067 A1 May 13, 2021

Related U.S. Application Data

(63) Continuation of application No. 16/355,036, filed on Mar. 15, 2019, now Pat. No. 10,887,185.

(51) Int. Cl.
*H04L 41/14* (2022.01)
*H04L 41/12* (2022.01)

(52) U.S. Cl.
CPC ............ *H04L 41/145* (2013.01); *H04L 41/12* (2013.01)

(58) Field of Classification Search
CPC ..... H04L 41/12; H04L 41/145; H04L 41/147; H04L 41/0896
See application file for complete search history.

(56) References Cited

U.S. PATENT DOCUMENTS

| 7,043,541 | B1 | 5/2006 | Bechtolsheim et al. |
| 9,392,471 | B1 * | 7/2016 | Thomas ................. H04L 43/16 |
| 10,887,185 | B1 | 1/2021 | Sidebottom |

(Continued)

FOREIGN PATENT DOCUMENTS

| CN | 103338414 A | 10/2013 |
| WO | 2016083841 A1 | 6/2016 |

OTHER PUBLICATIONS

Extended European search report for Application No. EP19216840.9, dated Jun. 19, 2020, 9 pages.

*Primary Examiner* — Chi Ho A Lee
(74) *Attorney, Agent, or Firm* — Harrity & Harrity, LLP

(57) ABSTRACT

A device receives network data associated with a network that includes network devices interconnected by links at an Internet protocol (IP) layer and an optical layer of the network. The device receives constraints associated with determining a network plan for the network, where the constraints include a constraint indicating a particular time period associated with determining potential network plans for the network. The device identifies variables and values of the variables for the network plan based on the network data, and determines, within the particular time period, the potential network plans for the network based on the constraints and the values of the variables. The device identifies a potential network plan, of the potential network plans, that minimizes costs associated with operating the network, and causes the identified potential network plan to be implemented in the network by the network devices.

20 Claims, 14 Drawing Sheets

(56) References Cited

U.S. PATENT DOCUMENTS

| | | |
|---|---|---|
| 2009/0290507 A1* | 11/2009 | Anand ................ H04L 41/145 |
| | | 370/254 |
| 2010/0023610 A1 | 1/2010 | Venugopal et al. |
| 2010/0284287 A1 | 11/2010 | Venuto |
| 2011/0170416 A1 | 7/2011 | Schwager et al. |
| 2012/0195229 A1 | 8/2012 | Chen |
| 2012/0213224 A1 | 8/2012 | Chen |
| 2013/0177305 A1 | 7/2013 | Prakash et al. |
| 2014/0040476 A1 | 2/2014 | Ishida |
| 2016/0112327 A1 | 4/2016 | Morris et al. |
| 2016/0134524 A1 | 5/2016 | Beshai |
| 2016/0188816 A1* | 6/2016 | Khainson ................ G16Z 99/00 |
| | | 705/2 |
| 2016/0226774 A1 | 8/2016 | Farmanbar |
| 2016/0344772 A1 | 11/2016 | Monahan et al. |
| 2017/0012856 A1 | 1/2017 | Zhao et al. |
| 2017/0331687 A1 | 11/2017 | Crickett et al. |
| 2017/0373943 A1 | 12/2017 | Goel et al. |
| 2018/0026850 A1 | 1/2018 | Obregon et al. |
| 2018/0034724 A1 | 2/2018 | Fedyk et al. |
| 2019/0081884 A1 | 3/2019 | Spohn et al. |

* cited by examiner

UTILIZING CONSTRAINTS TO DETERMINE OPTIMIZED NETWORK PLANS AND TO IMPLEMENT AN OPTIMIZED NETWORK PLAN

RELATED APPLICATION

This application is a continuation of U.S. patent application Ser. No. 16/355,036, filed Mar. 15, 2019 (now U.S. Pat. No. 10,887,185), the disclosure of which is incorporated herein by reference.

BACKGROUND

Network planning and design is an iterative process, encompassing topological design, network-synthesis, and network-realization. Network planning and design is aimed at ensuring that a new or an existing network or service satisfies needs of network subscribers and/or network operators.

SUMMARY

According to some implementations, a method may include receiving network data associated with a network, wherein the network includes a plurality of network devices interconnected by links at an Internet protocol (IP) layer and an optical layer of the network, and receiving constraints associated with determining a network plan for the network, wherein the constraints at least include a constraint indicating a particular time period associated with determining a plurality of potential network plans for the network. The method may include identifying variables and values of the variables for the network plan based on the network data, and determining, within the particular time period, the plurality of potential network plans for the network based on the constraints and the values of the variables. The method may include identifying a potential network plan, of the plurality of potential network plans, that minimizes costs associated with operating the network, and causing the identified potential network plan to be implemented in the network by the plurality of network devices.

According to some implementations, a device may include one or more memories, and one or more processors, communicatively coupled to the one or more memories, to receive network data associated with a network, wherein the network includes a plurality of network devices interconnected by links at an IP layer and an optical layer of the network, and wherein the network data includes topology data and path data associated with the network. The one or more processors may receive constraints associated with determining a network plan for the network, wherein the constraints enable determination of a plurality of potential network plans for the network within a particular time period. The one or more processors may identify variables and values of the variables for the network plan based on the network data, and may determine, within the particular time period, the plurality of potential network plans for the network based on the constraints and the values of the variables. The one or more processors may identify a potential network plan, of the plurality of potential network plans, that minimizes costs associated with operating the network, and may perform one or more actions based on the identified network plan.

According to some implementations, a non-transitory computer-readable medium may store instructions that include one or more instructions that, when executed by one or more processors of a device, may cause the one or more processors to receive network data associated with a network, wherein the network includes a plurality of network devices interconnected by links at an IP layer and an optical layer of the network. The one or more instructions may cause the one or more processors to receive constraints associated with determining a network plan for the network, wherein the constraints enable determination of a plurality of potential network plans for the network within a particular time period. The one or more instructions may cause the one or more processors to identify variables and values of the variables for the network plan based on the network data, and determine candidate links for each of the plurality of potential network plans based on the constraints and the values of the variables. The one or more instructions may cause the one or more processors to determine candidate paths for each of the plurality of potential network plans based on the constraints and the values of the variables, and determine, within the particular time period, the plurality of potential network plans for the network based on the candidate links and the candidate paths. The one or more instructions may cause the one or more processors to identify a potential network plan, of the plurality of potential network plans, that minimizes costs associated with operating the network, and cause the identified potential network plan to be implemented in the network by the plurality of network devices.

DETAILED DESCRIPTION

Figure 1A:
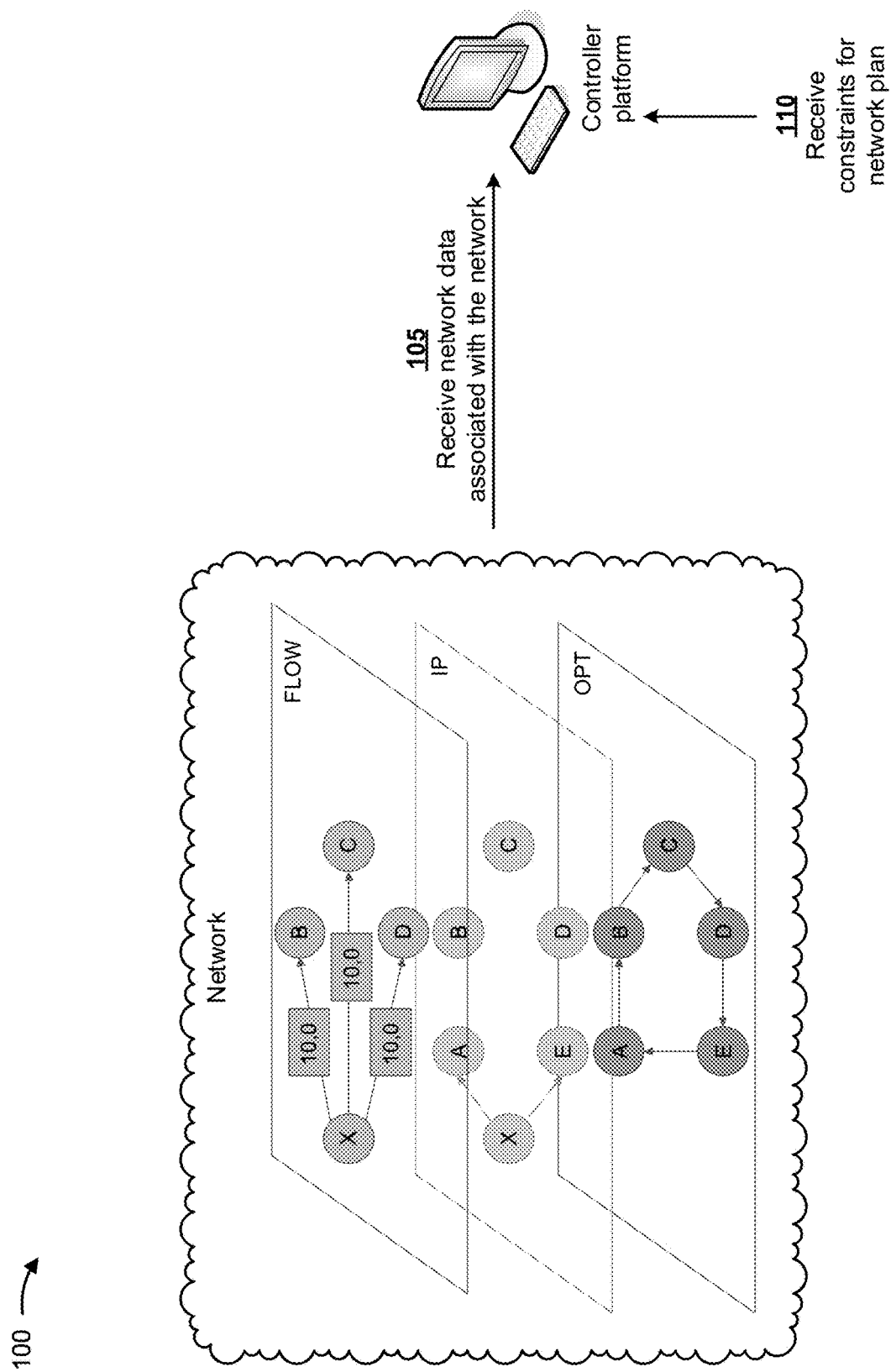
FIGS. 1A-1I are diagrams of one or more example implementations described herein.

The following detailed description of example implementations refers to the accompanying drawings. The same reference numbers in different drawings may identify the same or similar elements.

A network planning and design system may design a network that includes network devices (e.g., routers, switches, gateways, firewalls, etc.) and links provided between the network devices. However, if the network to be designed is large (e.g., includes hundreds, thousands, etc. of network devices and/or links), the network planning and design system may require an inordinate amount of time to determine the network plan. If the time required to determine the network plan is reduced, the network planning and design system may not generate an optimized network plan, which results in inefficient network operation and inefficient utilization of network resources. Furthermore, if the time required to determine the network plan is not reduced, the network planning and design system may overutilize computing resources (e.g., processing resources, memory resources, and/or the like), networking resources, and/or the like.

Some implementations described herein provide a controller platform that utilizes constraints to determine optimized network plans and to implement an optimized network plan. For example, the controller platform may receive network data associated with a network that includes multiple network devices interconnected by links at an Internet protocol (IP) layer and an optical layer of the network. The controller platform may receive constraints associated with determining a network plan for the network, where the constraints may include a constraint indicating a particular time period associated with determining multiple potential network plans for the network. The controller platform may identify variables and values of the variables for the network plan based on the network data, and may determine, within the particular time period, the multiple potential network plans for the network based on the constraints and the values of the variables. The controller platform may identify a potential network plan, of the multiple potential network plans, that minimizes costs associated with operating the network, and may cause the identified potential network plan to be implemented in the network by the multiple network devices.

In this way, the constraints may enable the controller platform to determine and implement an optimized network plan in a reduced amount of time. This, in turn, conserves computing resources (e.g., processing resources, memory resources, and/or the like), networking resources, and/or the like that would otherwise be wasted in identifying a sub-optimal network plan, correcting inefficient network operation caused by the sub-optimal network plan, correcting inefficient utilization of network resources caused by the sub-optimal network plan, and/or the like. Computing resources used to determine an optimized network plan are conserved due the reduced amount of time utilizing by the computing resources.

FIGS. 1A-1I are diagrams of one or more example implementations 100 described herein. As shown in FIG. 1A, a network may be associated with a controller platform. In some implementations, the network may include a packet optical network with multiple network devices and multiple links provided between the multiple network devices. In some implementations, the network may include multiple network layers, such as a flow layer (e.g., a logical layer not associated with network devices), an IP or packet layer, an optical layer, and/or the like. The network may include multiple sites and nodes (e.g., A, B, C, D, and E, although each site may include more than one node), a pseudo site (e.g., X) that represents the Internet, and demands at the flow layer (e.g., a demand, at the flow layer between sites X and C, of ten (10) megabits per second (Mb/s) in a forward direction and zero (0) Mb/s in a reverse direction).

In some implementations, the network may include a multilayer node provided in one or more of the layers. Nodes in two or more layers may be in adjacent layers. Thus, a multilayer node may not be provided in the flow and optical layers but may be provided in the flow and IP layers. Nodes may be provided in the flow layer if there are traffic demands between the nodes. Nodes may be provided in the IP layer if the nodes have IP routing capabilities and can be on ends of IP layer links. Nodes may be provided in the optical layer if the nodes have optical origination, termination, and/or switching capability. Optical connectivity may be required between sites, so that two IP nodes in different sites can have an IP link between them if the nodes are also in the optical layer. A network device (e.g., a router) with a long-haul dense wavelength division multiplexing (DWDM) interface card may be provided to connect the network device to optical switching (e.g., reconfigurable optical add-drop multiplexers (ROADMs)) or to other IP nodes with DWDM interface cards in a different site. IP nodes in the same site can be connected with IP links without requiring that the IP nodes be provided in the optical layer because the IP nodes can be connected with short haul copper or fiber cables. In the example of FIG. 1A, there may be no pure optical nodes but in general there could be intermediate pure optical nodes between nodes A-E in the optical layer.

The network may require assignment of network devices and/or links to the sites at the IP and optical layers. Question marks (not shown) may be provided between the flow and IP layers and may represent a quantity of traffic carried by a route or routes in the IP layer to satisfy traffic demands of the flow layer. Question marks may be provided in the IP layer and may represent a capacity of IP layer links, where the capacity of an IP link may be at least a sum of all traffic carried by all routes that use the IP link. Similar relationships may exist between the IP and optical layers where the links of the IP layer may induce demands to be routed at the optical layer. One difference is that traffic units at the optical layer may be different (e.g., in lambdas instead of Mb/s), so a conversion may be performed before determining whether a link at the optical layer includes sufficient capacity for routes that depend on the link.

As further shown in FIG. 1A, and by reference number 105, the controller platform may receive network data associated with the network. In some implementations, the network data may include topology data associated with the network, path data associated with the network, and/or the like. The topology data may include data identifying the network devices (e.g., data identifying types of the network devices, network identifiers of the network devices, locations of the network devices, hardware and/or software associated with the network devices, other network devices that are adjacent to the network devices, links connected to the network devices, ports associated with the network devices, and/or the like), the links interconnecting the network devices (e.g., data identifying types of the links, protocols used by the links, network devices to which the links are connected, ports associated with the network devices, and/or the like), utilizations of the network devices (e.g., capacities of the network devices, throughputs of the network devices, and/or the like), and/or the like. The path data may include data identifying paths through the network provided by the network devices, sources (e.g., one or more of the network devices, and/or the like) of the paths through the network, destinations (e.g., one or more of the network devices, and/or the like) of the paths through the network, utilizations of the paths through the network (e.g., capacities of the paths, throughputs of the paths, and/or the like), and/or the like.

The controller platform may periodically receive the network data from the network (e.g., at particular time intervals in seconds, minutes, hours, days, and/or the like), may continuously receive the network data from the network, and/or the like. For example, the controller platform may provide, to the network devices, a request for the network data, and the network devices may provide the network data to the controller platform based on the request.

As further shown in FIG. 1A, and by reference number 110, the controller platform may receive (e.g., from a client device) constraints associated with a network plan. In some implementations, the constraints may include a constraint indicating a particular time period associated with determining the network plan for the network, a constraint indicating a failure threshold associated with paths provided through the network by the network devices and the links, a constraint indicating capacities of the links, a constraint indicating possible paths for a traffic demand of the network, a constraint indicating no possible paths for the traffic demand, and/or the like. The constraint indicating the failure threshold may include a threshold count associated with a traffic demand failure by the network plan (e.g., discard a network plan that includes traffic demand failures exceeding the threshold count). The threshold count may be based on capacities of the links, a set of possible paths through the network for a traffic demand, and/or a constant indicating whether there is a certain path for the traffic demand or no possible path for the traffic demand.

Although FIG. 1A shows specific quantities of sites, nodes, network devices, links, and/or the like, in some implementations, the network may include more sites, nodes, network devices, links, and/or the like than depicted in FIG. 1A. For example, the network may include hundreds, thousands, and/or the like of network devices and/or links that generate thousands, millions, billions, etc. of data points. In this way, the controller platform may handle thousands, millions, billions, etc. of data points within a time period (e.g., when determining network plans), and thus may provide "big data" capability.

Figure 1B:
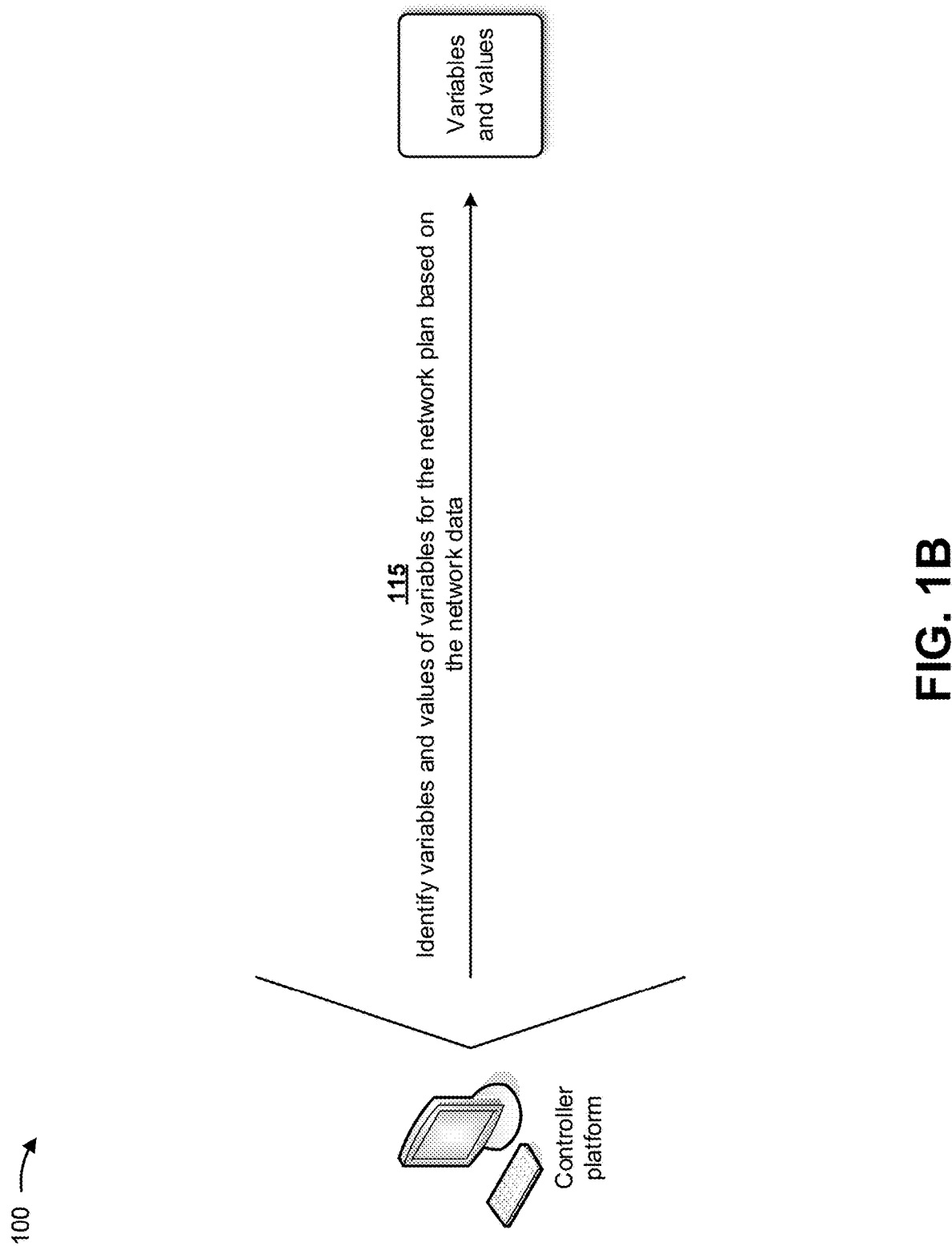

As shown in FIG. 1B, and by reference number 115, the controller platform may identify variables and values of variables for the network plan based on the network data. In some implementations, the network plan may be determined based on the variables associated with the network data, such as a quantity of network devices, a quantity of links interconnecting the network devices, capacities of the network devices, capacities of the links interconnecting the network devices, capacities of paths through the network provided by the network devices, and/or the like. The variables may be associated with different values that identify features associated with the variables. For example, a variable indicating a quantity of the network devices may be assigned a value indicative of the quantity, a desired quantity, and/or the like; a variable indicating a capacity of a link may be assigned a value indicative of the capacity, a desired capacity, and/or the like; and/or the like.

Figure 1C:
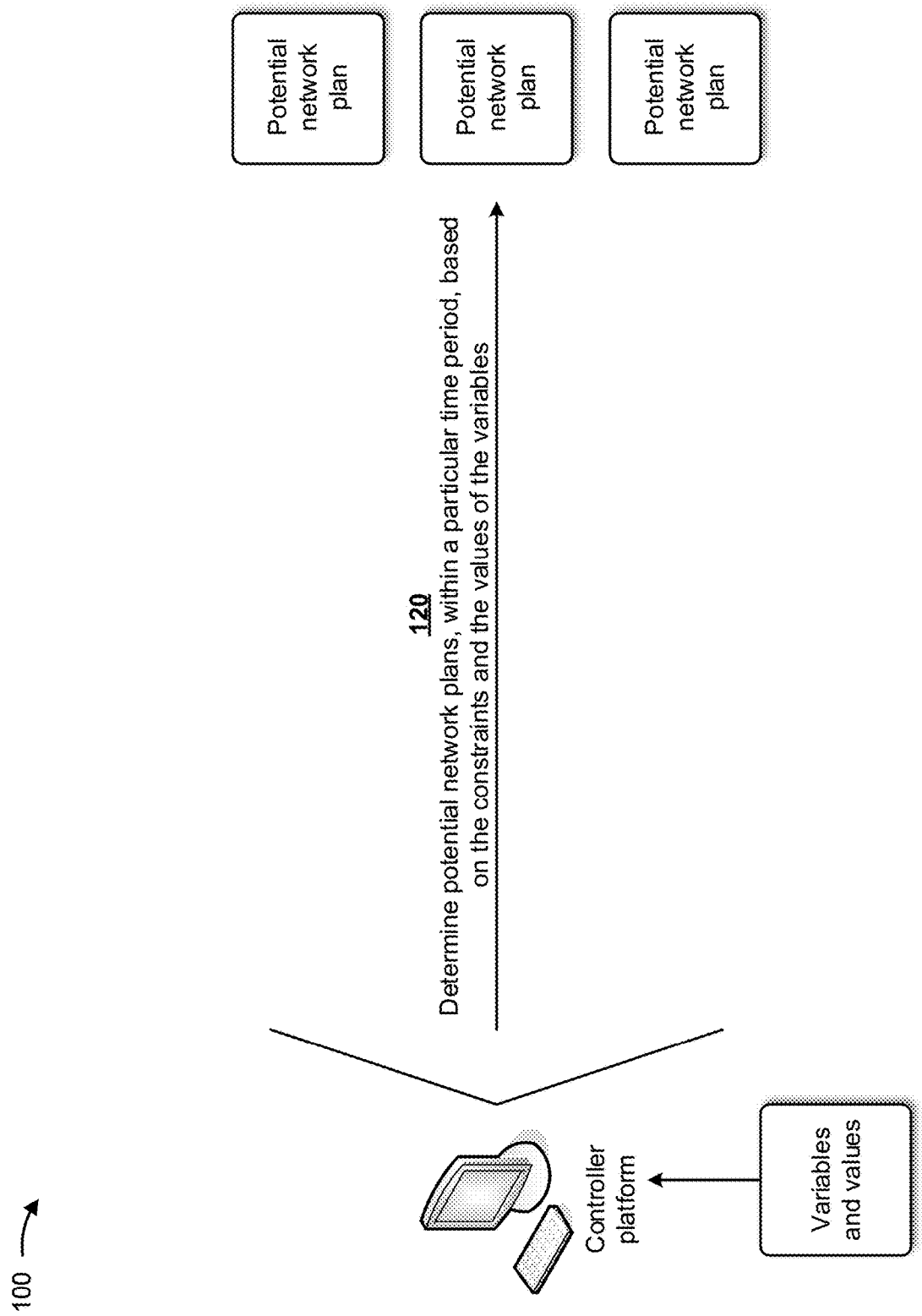

As shown in FIG. 1C, and by reference number 120, the controller platform may determine potential network plans, within a particular time period (e.g., as specified by the constraint indicating the particular time period associated with determining the network plan), based on the constraints and the values of the variables. For example, if the particular time period is small (e.g., in seconds or minutes), the controller platform may determine a first quantity of potential network plans, and if the particular time period is larger (e.g., in minutes or hours), the controller platform may determine a second quantity of potential network plans that is larger than the first quantity of potential network plans. Thus, the particular time period may be utilized (e.g., by a user of the controller platform) to determine resource usage of the controller platform and/or the quantity of potential network plans generated by the controller platform.

In some implementations, the controller platform may utilize the constraints to set the values of the variables, specify minimums for the values of the variables, specify maximums for the values of the variables, change the values of the variables, determine quickly whether the values of the variables result in a solution (e.g., a potential network plan), and/or the like. Such information may be utilized by the controller platform when determining the potential network plans. For example, the controller platform may utilize the constraints to select a variable, to select a value for the variable, and/or to backtrack to a last selected value if all values of a variable have been selected and eliminated.

In some implementations, the controller platform may utilize the constraints to determine implications of the values selected for the variables by projecting relationships among variables. For example, for integer variables with domains $X \in \Delta_X$, $\Delta_Y$ with a relation (R) on the integer variables of $R(X,Y) \in I \times I$, where $\Delta_X = \{1, 2, 3\}$, $\Delta_Y = \{0, 2, 4\}$ and $R(X,Y) = (2 \times X = Y) = \{\ldots, (-2, -4), (-1, -2), (0, 0), (1, 2), (2, 4), \ldots\}$, the projecting relationships may result in $\pi_X R (\Delta_X, \Delta_Y) = \{x | \exists y(x,y) \in \cap \Delta_X \times \Delta_Y\} \cong$ keep supported values. Thus, for the example domain, $\pi_X(2 \times X = Y)(\{1, 2, 3\}, \{0, 1, 2, 3, 4\}) = \{1, 2\}$ and $\pi_Y(2 \times X = Y)(\{1,2,3\},\{0,1,2,3,4\}) = \{2, 4\}$.

In some implementations, the controller platform may utilize the constraints to determine implications of the values selected for the variables based on a consistency model. For example, if nodes (e.g., network devices) represent variables with domains, and links represent relations between the variables as follows $(R(X, Y))^{-1} = R(X, Y)$, then a set of relations to enforce may be represented as R and Q may represent $R(X, Y)$ where $\Delta_Y$ has changed. In this example, the consistency model may perform the following procedure:

procedure Consistency(R={ . . . , R(X, Y), . . . }, Q⊆∪R$^{-1}$):

while Q≠∅ remove R(X, Y) from Q $\Delta_X \leftarrow \pi_X R(\Delta X, \Delta Y)$ if $\Delta_X = \emptyset$, then fail if $\Delta_X$ changed, then Q←Q ∪{R(Z,X)|Z≠Y}.

In some implementations, the controller platform may utilize the consistency model to generate a partially consistent result since consistency can be generalized to relations on any number of variables and $\pi$ can be expensive or complicated to compute. In order to generate the partially consistent result, the controller platform may exclude some but not necessarily all values of the variables based on interval reasoning. For example, if $R=(2 \times X=Y)$, then $$\text{approx } \pi_X R = \left[ \left\lceil \frac{\min(\Delta_Y)}{2} \right\rceil, \left\lfloor \frac{\max(\Delta_Y)}{2} \right\rfloor \right] \text{ and}$$

$$\text{approx } \pi_Y R = [2 \times \max(\Delta_Y), 2 \times \max(\Delta_Y)].$$

Applying actual numbers results in approx $\pi_X(2 \times X=Y)(\{1, 2, 3\}, \{2, 5, 7\}) = [1, 3]$ and approx $\pi_Y(2 \times X=Y)(\{1, 3\}, \{2, 3, 4, 5, 6\}) = [2, 6]$.

In some implementations, the controller platform may assign costs to the potential network plans based on a variety of factors, such as quantities of network devices utilized in the potential network plans, quantities and lengths of links utilized in the potential network plans, utilizations of utilized network devices, utilizations of the links, and/or the like. For example, each factor may be associated with a respective cost (e.g., a link may cost more than a network device), and the controller platform may assign the respective costs to the different factors based on the potential network plan. In some implementations, the controller platform may determine penalties associated with failures of the potential network plans in meeting traffic demands of the network, and may add the penalties to the costs assigned to the potential network plans.

In some implementations, if one of the potential network plans fails to satisfy the constraint indicating the failure threshold (e.g., if the one of the potential network plans includes traffic demand failures that exceed the failure threshold), the controller platform may remove the one of the potential network plans from consideration, may highlight the one of the potential network plans, and/or the like. Such a constraint may be referred to as a demand fail constraint and may permit visualization of implications of design choices made in a search for an optimal solution.

Figure 1D:
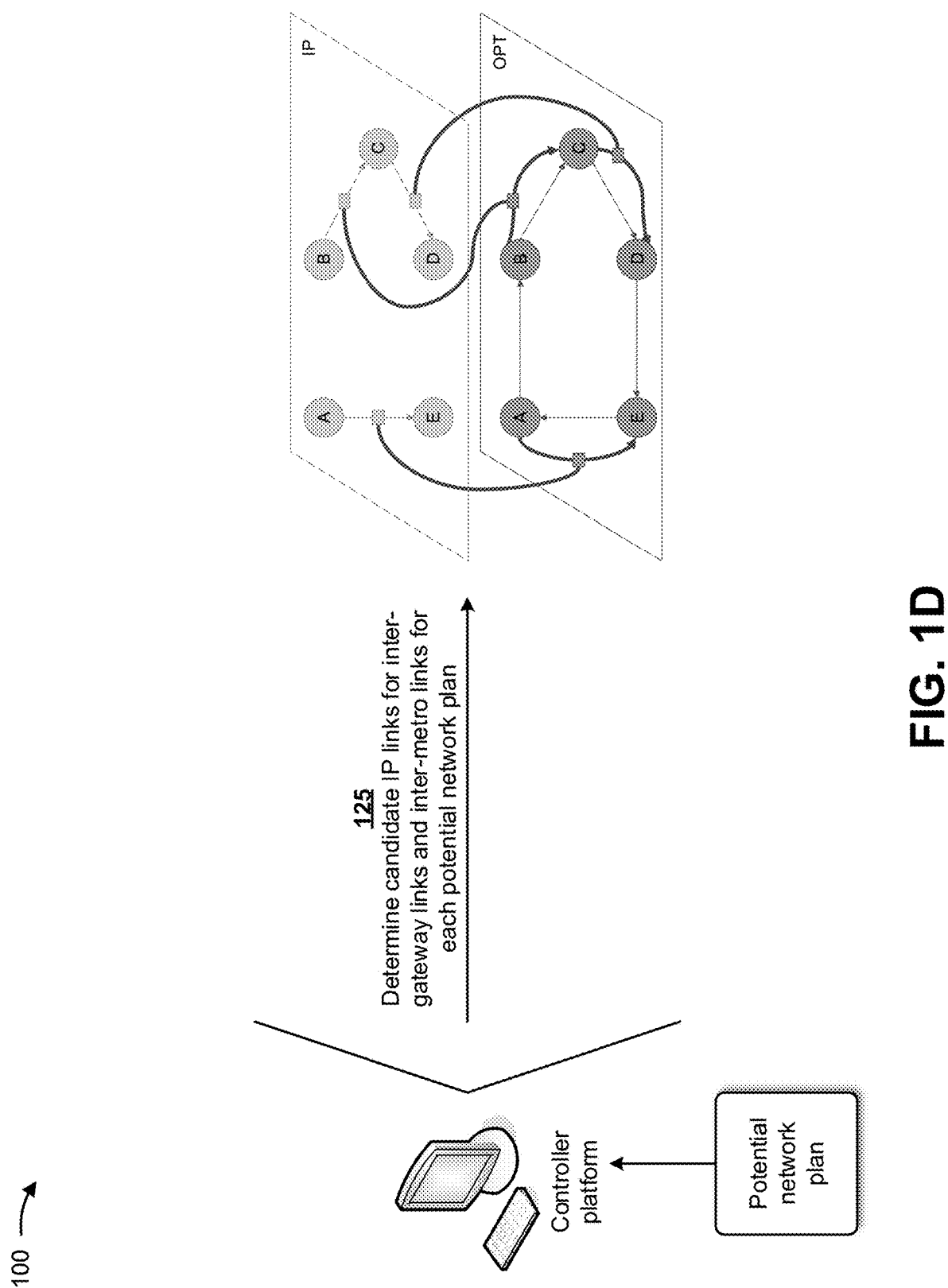

As shown in FIG. 1D, and by reference number 125, the controller platform, when determining the potential network plans, may determine candidate IP links for inter-gateway links (e.g., inter-gateway link AE) and inter-metro links (e.g., inter-metro links BC and CD) for each potential network plan. Each site (e.g., A, B, C, D, and E) may include one multilayer node. In the IP layer, nodes A and E may represent Internet gateways, and nodes B, C, and D may represent access nodes to which customers connect. The traffic flow demands in this example may be 100 Mb/s from X to each of nodes B, C, and D. The IP layer may include links from X to nodes A and E which do not need to be routed in the optical layer. The optical layer may include a metro ring around the five nodes. In this example, the controller platform may determine candidate IP links for inter-gateway links (e.g., links connecting gateways and access nodes that include a single direct one hop route in the optical layer) and for inter-metro links.

Figure 1E:
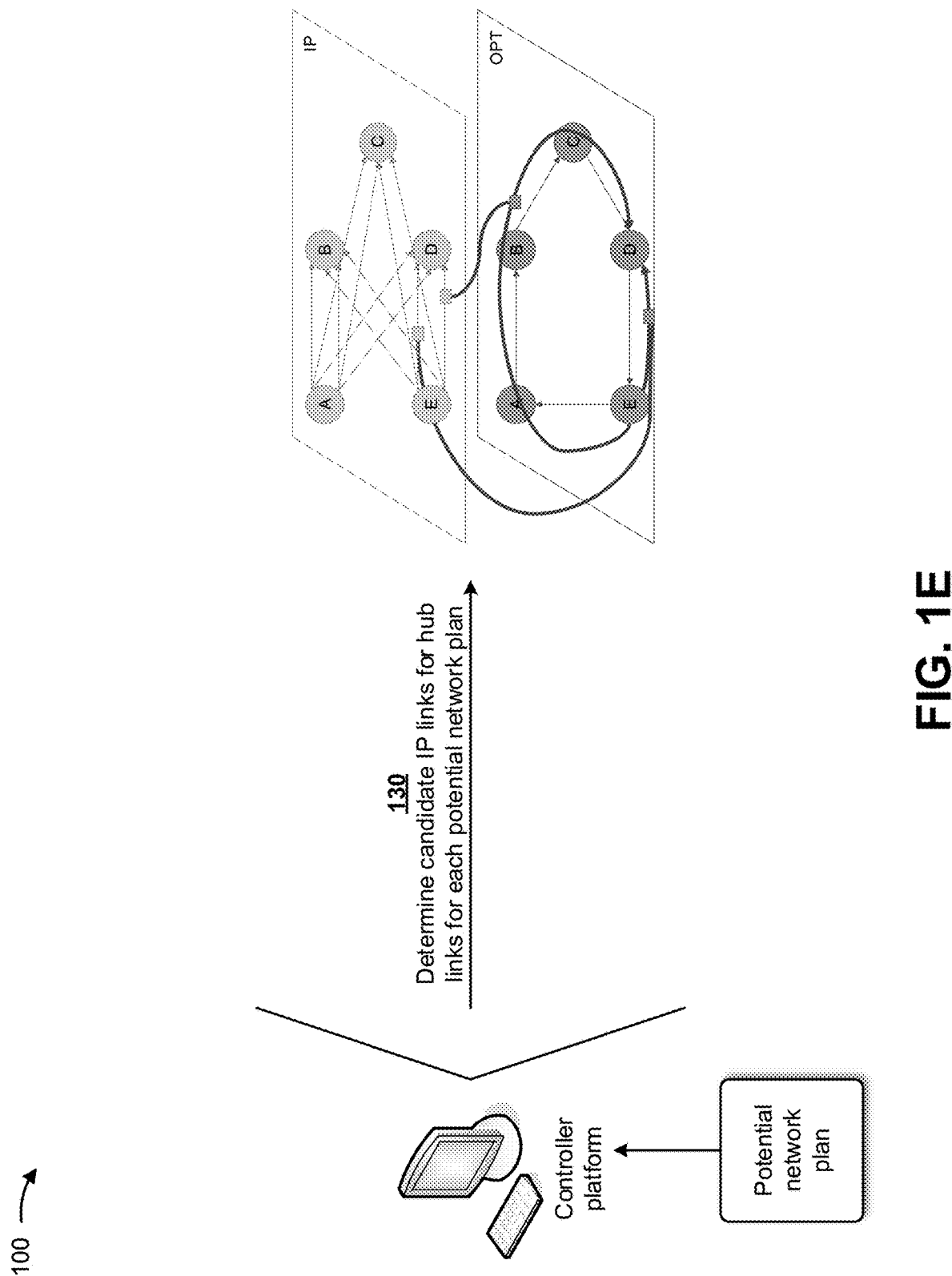

As shown in FIG. 1E, and by reference number 130, the controller platform, when determining the potential network plans, may determine candidate IP links for hub links for each potential network plan. For example, the controller platform may determine hub links between gateway-access node pairs (e.g., two hub links between AB, AC, AD, EB, EC, and ED), where for each gateway-access node pair, two links may include one route clockwise around the metro ring, and another route counterclockwise around the metro ring). The controller platform may associate costs with the hub links (e.g., a cost of three (3) for a first optical layer hop and a cost of two (2) for each additional hop). In this example, the flow layer links may be routed over the IP layer links with the four shortest routes being included in the potential network plan as candidate links.

Figure 1F:
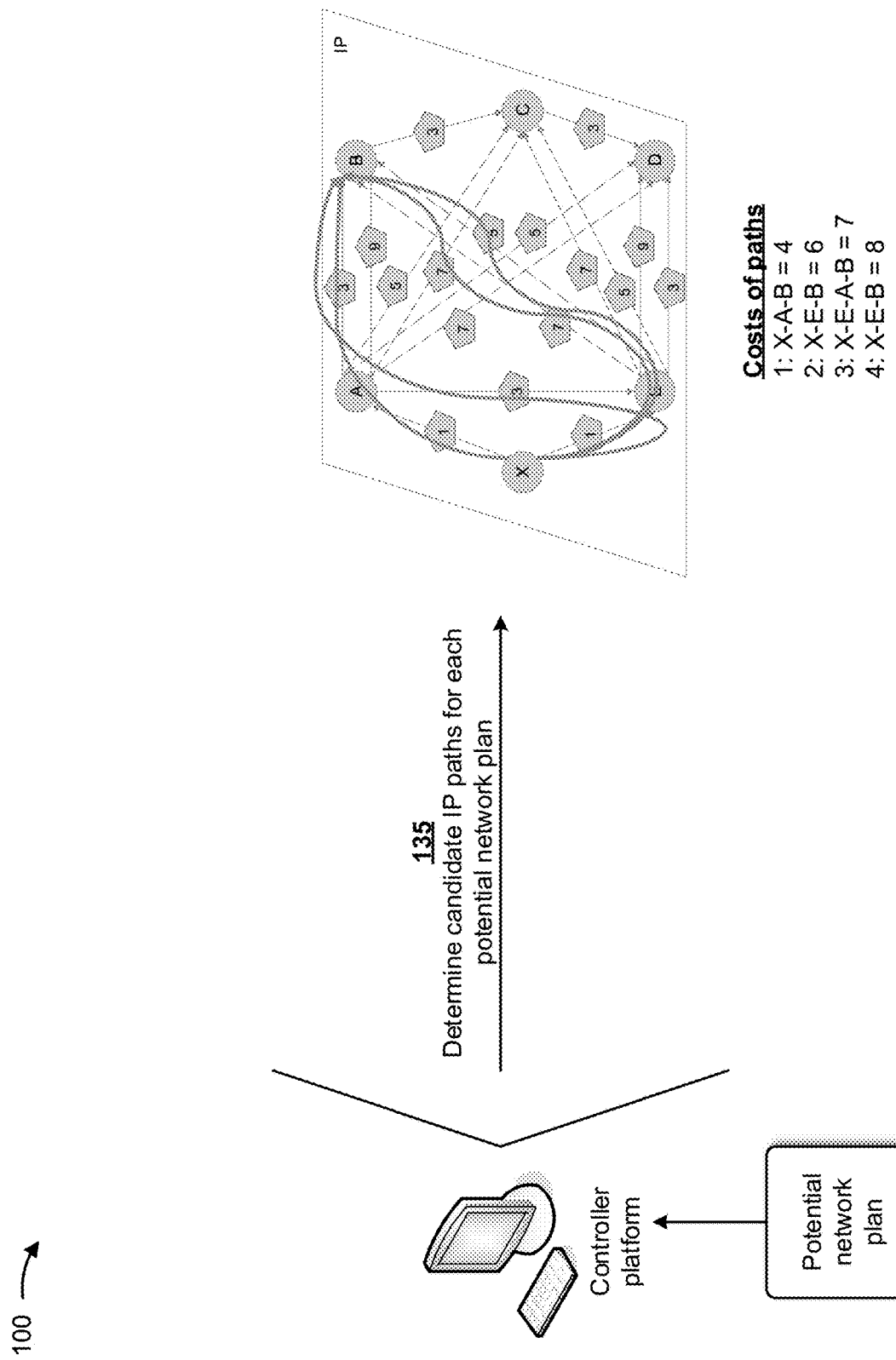

As shown in FIG. 1F, and by reference number 135, the controller platform, when determining the potential network plans, may determine candidate IP paths for each potential network plan. For example, the controller platform may determine a first candidate IP path of X-A-B (e.g., with a cost of four), a second candidate IP path of X-E-B (e.g., with a cost of six), a third candidate IP path of X-E-A-B (e.g., with a cost of seven), and a fourth candidate IP path of X-E-B (e.g., with a cost of eight). Once the candidate IP links and the candidate IP paths are determined, the controller platform may determine the potential network plans based on the candidate IP links and the candidate IP paths. For example, the controller platform may select candidate IP links and candidate IP paths for a potential network plan, and may determine a cost associated with the potential network plan. The controller platform may select different candidate IP links and candidate IP paths in an attempt to reduce the cost associated with the potential network plan.

Figure 1G:
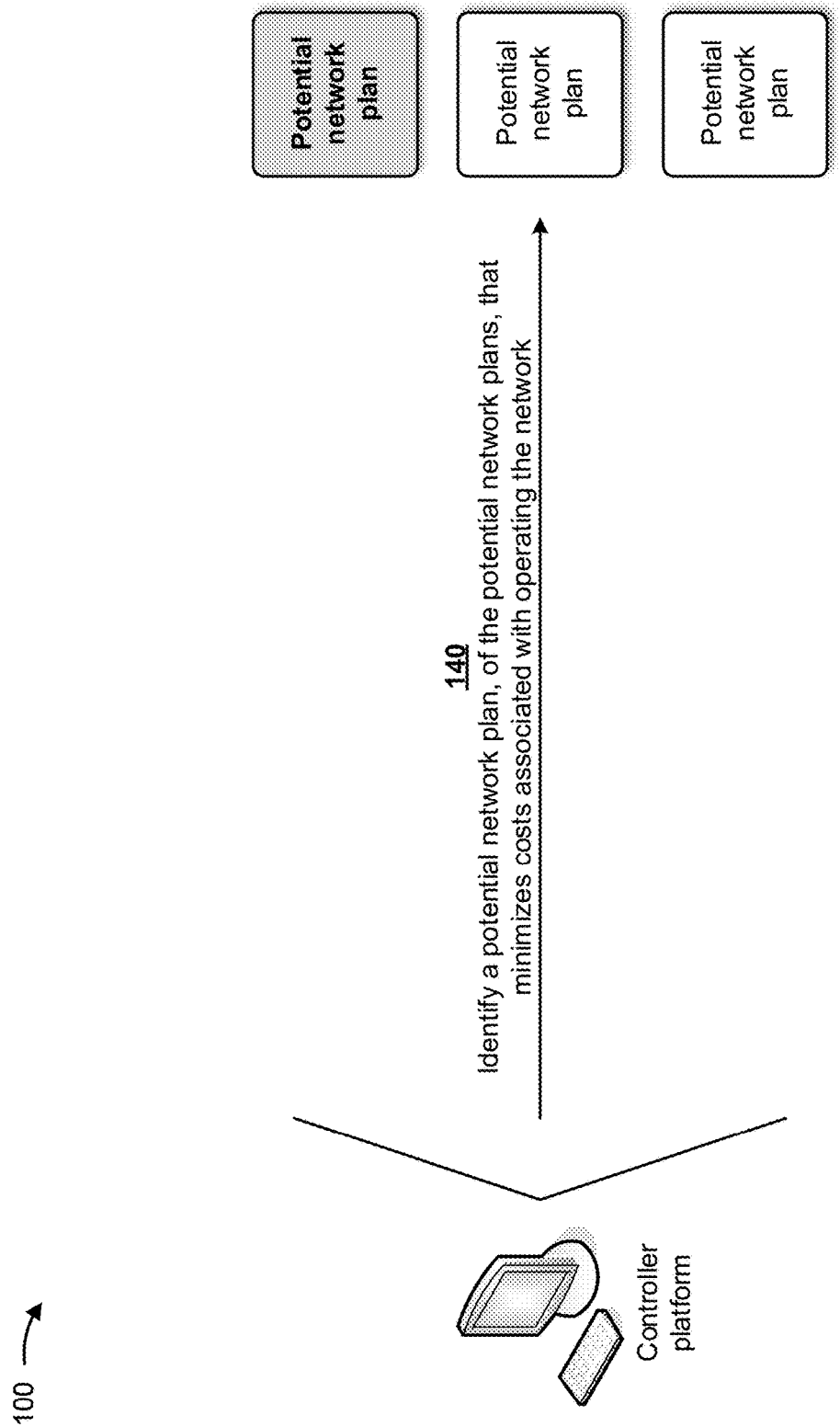

As shown in FIG. 1G, and by reference number 140, the controller platform may identify a potential network plan, of the potential network plans, that minimizes costs associated with operating the network (e.g., reduces resource usage by the network). In some implementations, the controller platform may compare the costs determined for each of the potential network plans, and may select a potential network plan with a lowest cost. In some implementations, the controller platform may select a potential network plan with a lowest quantity of traffic demand failures, even if the potential network plan does not include the lowest cost. The controller platform may select a potential network plan with a lowest quantity of traffic demand failures and a lowest cost. In some implementations, the controller platform may provide information identifying the potential network plans to a client device, and may receive a selection of a potential network plan from the client device. The controller platform may utilize the potential network plan identified by the selection.

Figure 1H:
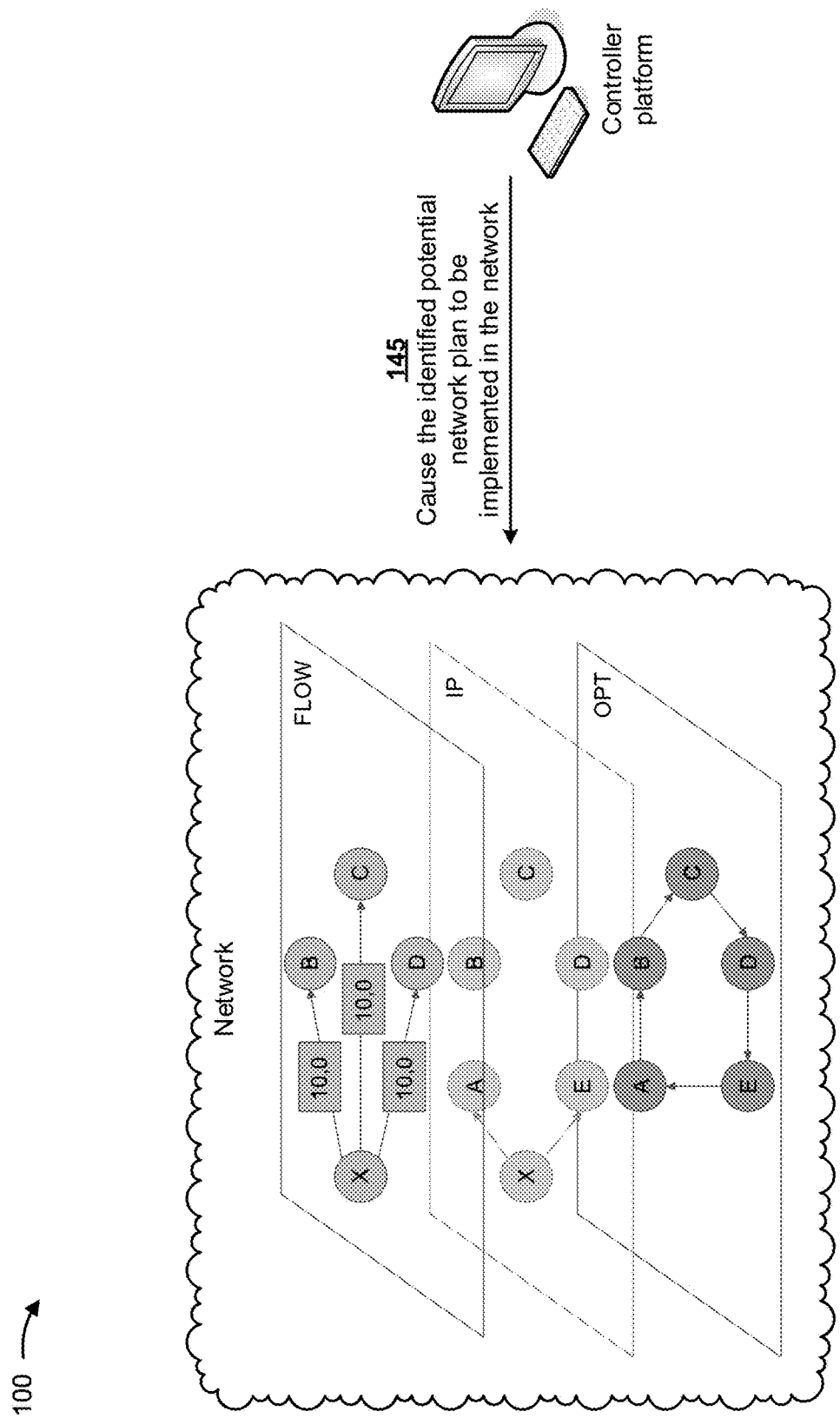

As shown in FIG. 1H, and by reference number 145, the controller platform may cause the identified potential network plan to be implemented in the network. For example, the controller platform may cause the candidate links and the candidate paths selected for the identified network plan to be implemented by the network devices and the links of the network. In some implementations, the controller platform may cause the identified potential network plan to be implemented in the network by providing, to one or more of the network devices, instructions indicating that the one or more network devices, and the links associated with the one or more network devices, are to implement the identified potential network plan. The one or more network devices may receive the instructions and may implement the identified potential network plan based on the instructions. For example, the controller device may provide, to three network devices, instructions indicating that the three network devices (e.g., and two links provided between the three network devices) are to reserve bandwidth for a traffic demand. The three network devices may receive the instructions and may reserve the bandwidth for the traffic demand based on the instructions.

In some implementations, the controller platform may determine network changes to be implemented by mechanisms other than the controller platform. For example, the controller platform may determine new designs that involve establishing new sites, installing new nodes, leasing or installing new long haul fiber optic cables, and/or the like.

In some implementations, the controller platform may receive additional network data from the network based on causing the identified potential network plan to be implemented in the network, and may modify the identified potential network plan based on the additional network data to generate a modified potential network plan. For example, if the additional network data indicates that a portion of the network is failing to manage a new traffic demand, the controller platform may modify the identified potential network plan to manage the new traffic demand. The controller platform may then cause the modified potential network plan to be implemented in the network, as described above.

Figure 1I:
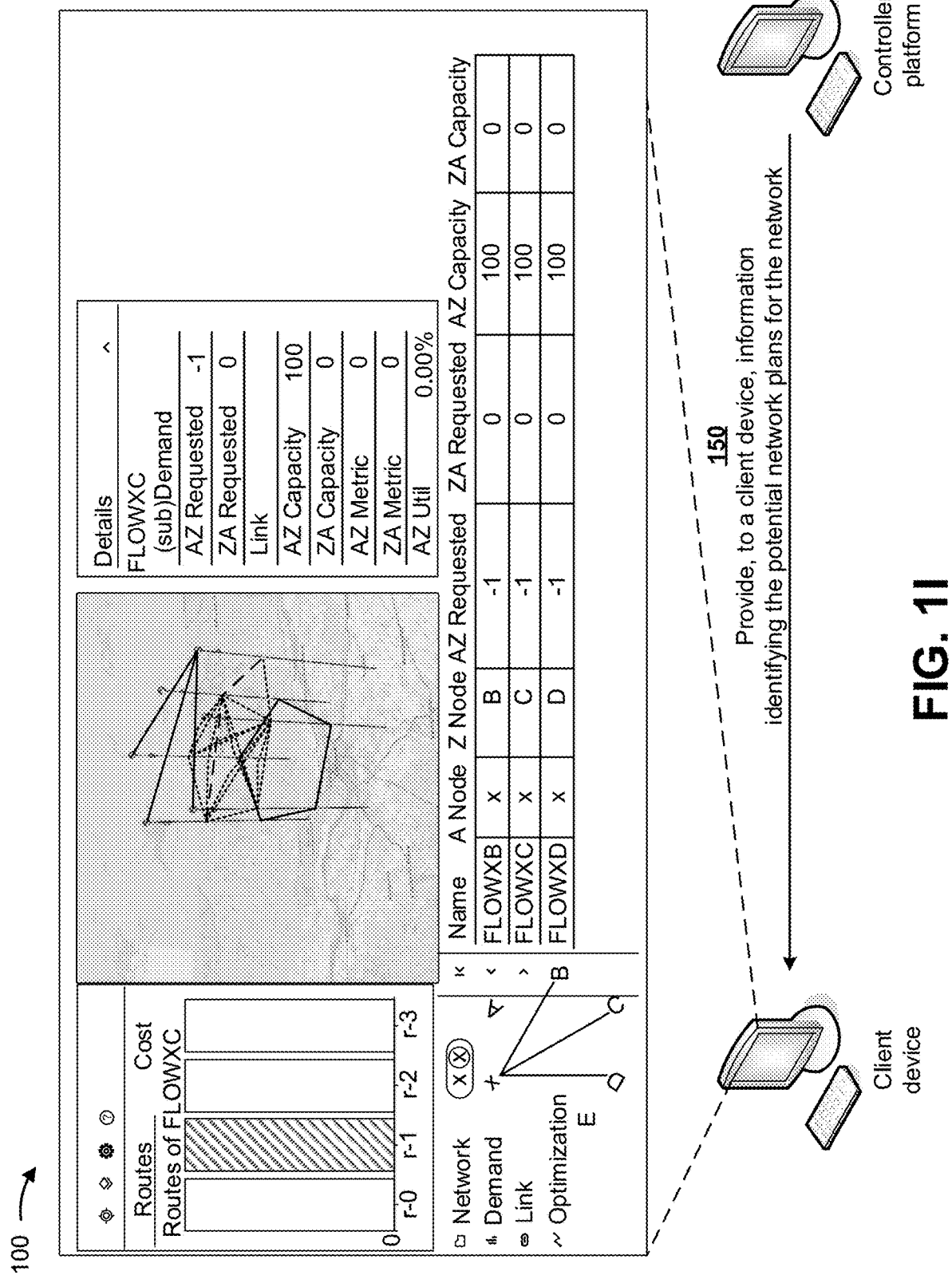

As shown in FIG. 1I, and by reference number 150, the controller platform may provide, to a client device, information identifying the potential network plans for the network. The client device may receive the information identifying the potential network plans and may provide the information identifying the potential network plans for display via a user interface. The user interface may enable a user of the client device to view features associated with the potential network plans, to see a graphical representation of selected potential network plan, to select a potential network plan for implementations, and/or the like.

In this way, the controller platform may determine and implement an optimized network plan in a reduced amount of time. This, in turn, conserves computing resources (e.g., processing resources, memory resources, and/or the like), networking resources, and/or the like that would otherwise be wasted in identifying a sub-optimal network plan, correcting inefficient network operation caused by the sub-optimal network plan, correcting inefficient utilization of network resources caused by the sub-optimal network plan, and/or the like. Furthermore, implementations described herein use a rigorous, computerized process to perform tasks that were not previously performed. For example, currently there does not exist a technique that utilizes constraints to determine optimized network plans and to implement an optimized network plan.

As indicated above, FIGS. 1A-1I are provided merely as examples. Other examples may differ from what is described with regard to FIGS. 1A-1I.

Figure 2:
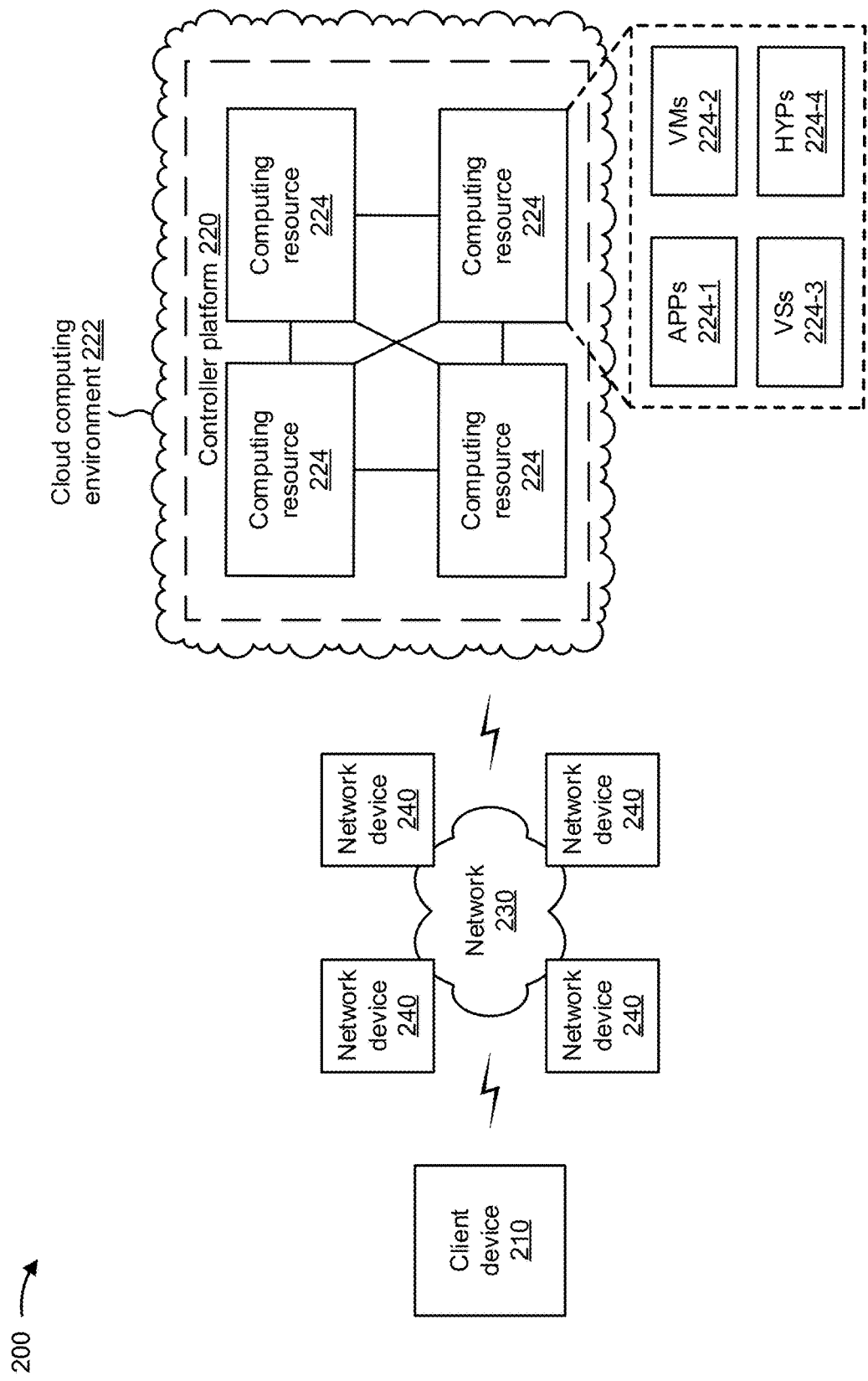
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a controller platform 220, a network 230, and a group of network devices 240 of network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, client device 210 may receive information from and/or transmit information to controller platform 220, via network 230 and network devices 240. In some implementations, client device 210 may receive network traffic from and/or may provide network traffic to other client devices 210 via network 230 (e.g., by routing packets using network devices 240 as intermediaries).

Controller platform 220 includes one or more devices that utilize constraints to determine optimized network plans and to implement an optimized network plan. In some implementations, controller platform 220 may be designed to be modular such that certain software components may be swapped in or out depending on a particular need. As such, controller platform 220 may be easily and/or quickly reconfigured for different uses. In some implementations, controller platform 220 may receive information from and/or transmit information to one or more client devices 210 and/or network devices 240.

In some implementations, as shown, controller platform 220 may be hosted in a cloud computing environment 222. Notably, while implementations described herein describe controller platform 220 as being hosted in cloud computing environment 222, in some implementations, controller platform 220 may not be cloud-based (i.e., may be implemented outside of a cloud computing environment) or may be partially cloud-based.

Cloud computing environment 222 includes an environment that hosts controller platform 220. Cloud computing environment 222 may provide computation, software, data access, storage, etc., services that do not require end-user knowledge of a physical location and configuration of system(s) and/or device(s) that hosts controller platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host controller platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210 and/or network devices 240. For example, application 224-1 may include software associated with controller platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 or an operator of controller platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Network device 240 includes one or more devices capable of receiving, processing, storing, routing, and/or providing traffic (e.g., a packet, other information or metadata, and/or the like) in a manner described herein. For example, network device 240 may include a router, such as a label switching router (LSR), a label edge router (LER), an ingress router, an egress router, a provider router (e.g., a provider edge router, a provider core router, etc.), a virtual router, and/or the like. Additionally, or alternatively, network device 240 may include a gateway, a switch, a firewall, a hub, a bridge, a reverse proxy, a server (e.g., a proxy server, a cloud server, a data center server, etc.), a load balancer, and/or a similar device. In some implementations, network device 240 may be a physical device implemented within a housing, such as a chassis. In some implementations, network device 240 may be a virtual device implemented by one or more computer devices of a cloud computing environment or a data center. In some implementations, a group of network devices 240 may be a group of data center nodes that are used to route traffic flow through network 230.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
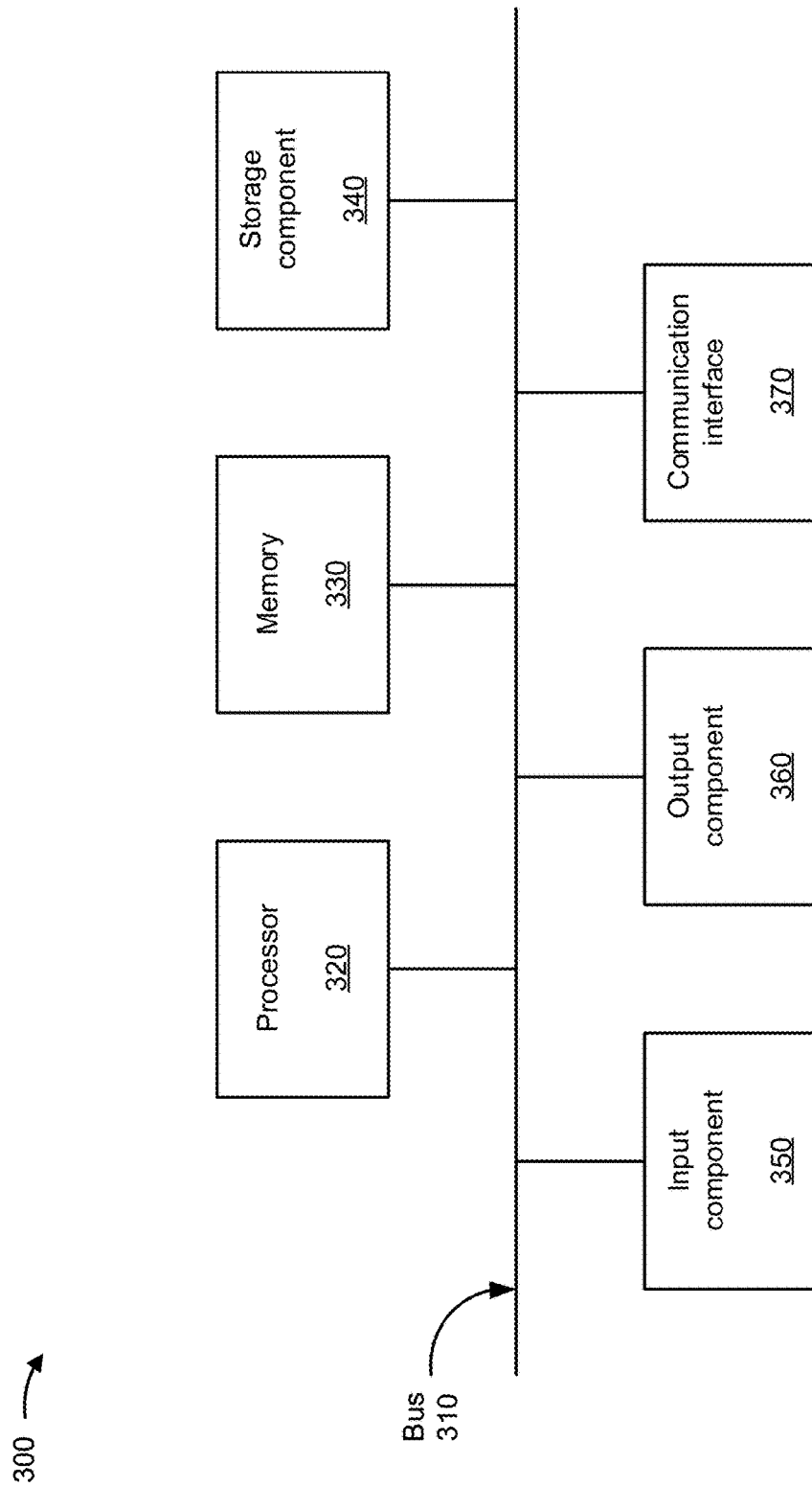
FIG. 3 is a diagram of example components of one or more devices of FIG. 2.

FIG. 3 is a diagram of example components of a device 300. Device 300 may correspond to client device 210, controller platform 220, computing resource 224, and/or network device 240. In some implementations, client device 210, controller platform 220, computing resource 224, and/or network device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
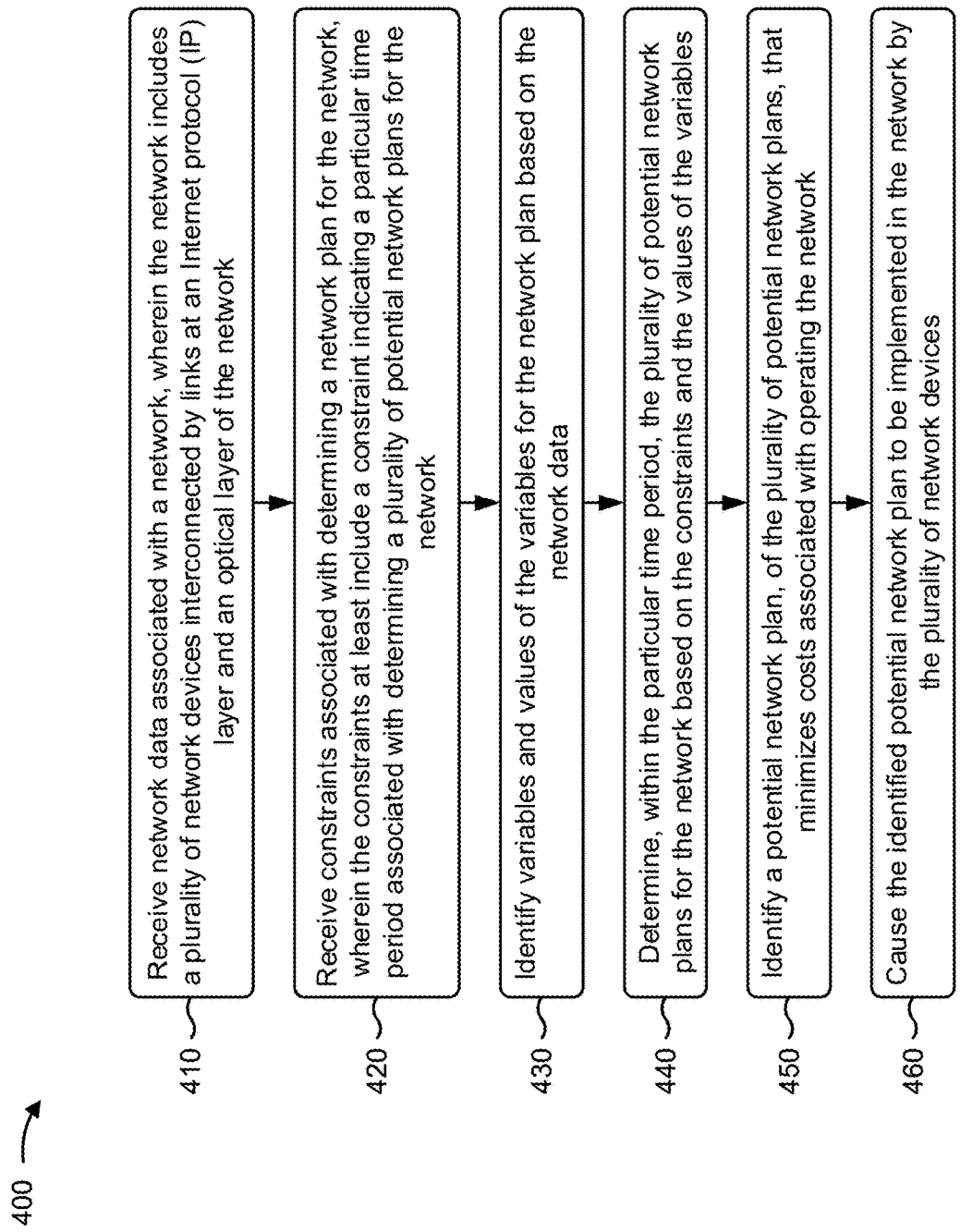
FIGS. 4-6 are flow charts of example processes for utilizing constraints to determine optimized network plans and to implement an optimized network plan.

FIG. 4 is a flow chart of an example process 400 for utilizing constraints to determine optimized network plans and to implement an optimized network plan. In some implementations, one or more process blocks of FIG. 4 may be performed by a controller platform (e.g., controller platform 220). In some implementations, one or more process blocks of FIG. 4 may be performed by another device or a group of devices separate from or including the controller platform, such as a client device (e.g., client device 210) and/or a network device (e.g., network device 240).

As shown in FIG. 4, process 400 may include receiving network data associated with a network, wherein the network includes a plurality of network devices interconnected by links at an Internet protocol (IP) layer and an optical layer of the network (block 410). For example, the controller platform (e.g., using computing resource 224, processor 320, communication interface 370, and/or the like) may receive network data associated with a network, as described above in connection with FIGS. 1A-3. In some aspects, the network may include a plurality of network devices interconnected by links at an IP layer and an optical layer of the network.

As further shown in FIG. 4, process 400 may include receiving constraints associated with determining a network plan for the network, wherein the constraints at least include a constraint indicating a particular time period associated with determining a plurality of potential network plans for the network (block 420). For example, the controller platform (e.g., using computing resource 224, communication interface 370, and/or the like) may receive constraints associated with determining a network plan for the network, as described above in connection with FIGS. 1A-3. In some aspects, the constraints may at least include a constraint indicating a particular time period associated with determining a plurality of potential network plans for the network.

As further shown in FIG. 4, process 400 may include identifying variables and values of the variables for the network plan based on the network data (block 430). For example, the controller platform (e.g., using computing resource 224, processor 320, memory 330, and/or the like) may identify variables and values of the variables for the network plan based on the network data, as described above in connection with FIGS. 1A-3.

As further shown in FIG. 4, process 400 may include determining, within the particular time period, the plurality of potential network plans for the network based on the constraints and the values of the variables (block 440). For example, the controller platform (e.g., using computing resource 224, processor 320, storage component 340, and/or the like) may determine, within the particular time period, the plurality of potential network plans for the network based on the constraints and the values of the variables, as described above in connection with FIGS. 1A-3. In some implementations, the controller platform may determine the plurality of potential network plans until the particular time period expires.

As further shown in FIG. 4, process 400 may include identifying a potential network plan, of the plurality of potential network plans, that minimizes costs associated with operating the network (block 450). For example, the controller platform (e.g., using computing resource 224, processor 320, memory 330, storage component 340, and/or the like) may identify a potential network plan, of the plurality of potential network plans, that minimizes costs associated with operating the network, as described above in connection with FIGS. 1A-3. In some implementations, the controller platform may identify the potential network plan within the particular time period.

As further shown in FIG. 4, process 400 may include causing the identified potential network plan to be implemented in the network by the plurality of network devices (block 460). For example, the controller platform (e.g., using computing resource 224, processor 320, memory 330, communication interface 370, and/or the like) may cause the identified potential network plan to be implemented in the network by the plurality of network devices, as described above in connection with FIGS. 1A-3.

Process 400 may include additional implementations, such as any single implementation or any combination of implementations described below and/or in connection with one or more other processes described elsewhere herein.

In some implementations, the network data may include data identifying the plurality of network devices, the links interconnecting the plurality of network devices, capacities of the plurality of network devices, capacities of the links interconnecting the plurality of network devices, paths through the network provided by the plurality of network devices, sources of the paths through the network, destinations of the paths through the network, capacities of the paths through the network, and/or the like. In some implementations, the constraints may include a constraint indicating a failure threshold associated with paths provided through the network by the plurality of network devices and the links, a constraint indicating capacities of the links, a constraint indicating possible paths for a traffic demand of the network, a constraint indicating no possible paths for the traffic demand, and/or the like.

In some implementations, the controller platform, when determining the plurality of potential network plans for the network, may determine candidate links for each of the plurality of potential network plans based on the constraints and the values of the variables, may determine candidate paths for each of the plurality of potential network plans based on the constraints and the values of the variables, and may determine the plurality of potential network plans for the network based on the candidate links and the candidate paths.

In some implementations, the controller platform, when determining the plurality of potential network plans for the network, may determine relationships between the values of the variables based on the constraints, may determine implications of the values of the variables on the plurality of potential network plans based on the relationships between the values of the variables, and may determine the plurality of potential network plans for the network based on the implications of the values of the variables. In some implementations, the controller platform, when determining the plurality of potential network plans for the network, may utilize a consistency model to determine implications of the values of the variables on the plurality of potential network plans, and may determine the plurality of potential network plans for the network based on the implications of the values of the variables. In some implementations, the controller platform, when determining the plurality of potential network plans for the network, may remove or exclude a portion of the values of the variables and may determine the plurality of potential network plans for the network based on removing the portion of the values of the variables.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
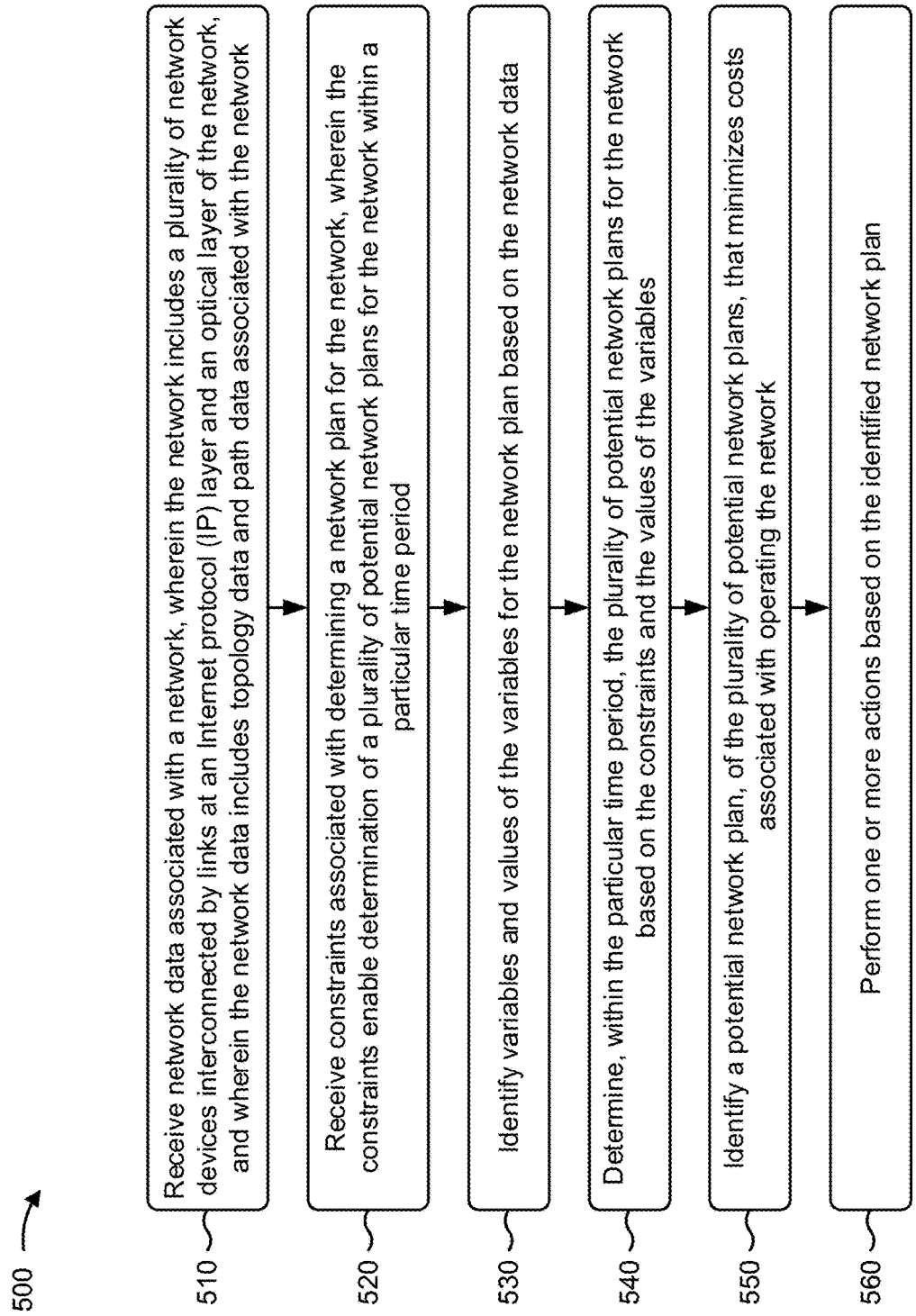

FIG. 5 is a flow chart of an example process 500 for utilizing constraints to determine optimized network plans and to implement an optimized network plan. In some implementations, one or more process blocks of FIG. 5 may be performed by a controller platform (e.g., controller platform 220). In some implementations, one or more process blocks of FIG. 5 may be performed by another device or a group of devices separate from or including the controller platform, such as a client device (e.g., client device 210) and/or a network device (e.g., network device 240).

As shown in FIG. 5, process 500 may include receiving network data associated with a network, wherein the network includes a plurality of network devices interconnected by links at an Internet protocol (IP) layer and an optical layer of the network and wherein the network data includes topology data and path data associated with the network (block 510). For example, the controller platform (e.g., using computing resource 224, processor 320, communication interface 370, and/or the like) may receive network data associated with a network, as described above in connection with FIGS. 1A-3. In some aspects, the network may include a plurality of network devices interconnected by links at an IP layer and an optical layer of the network. In some aspects, the network data may include topology data and path data associated with the network.

As further shown in FIG. 5, process 500 may include receiving constraints associated with determining a network plan for the network, wherein the constraints enable determination of a plurality of potential network plans for the network within a particular time period (block 520). For example, the controller platform (e.g., using computing resource 224, processor 320, communication interface 370, and/or the like) may receive constraints associated with determining a network plan for the network, as described above in connection with FIGS. 1A-3. In some aspects, the constraints may enable determination of a plurality of potential network plans for the network within a particular time period.

As further shown in FIG. 5, process 500 may include identifying variables and values of the variables for the network plan based on the network data (block 530). For example, the controller platform (e.g., using computing resource 224, processor 320, memory 330, and/or the like) may identify variables and values of the variables for the network plan based on the network data, as described above in connection with FIGS. 1A-3.

As further shown in FIG. 5, process 500 may include determining, within the particular time period, the plurality of potential network plans for the network based on the constraints and the values of the variables (block 540). For example, the controller platform (e.g., using computing resource 224, processor 320, storage component 340, and/or the like) may determine, within the particular time period, the plurality of potential network plans for the network based on the constraints and the values of the variables, as described above in connection with FIGS. 1A-3.

As further shown in FIG. 5, process 500 may include identifying a potential network plan, of the plurality of potential network plans, that minimizes costs associated with operating the network (block 550). For example, the controller platform (e.g., using computing resource 224, processor 320, memory 330, storage component 340, and/or the like) may identify a potential network plan, of the plurality of potential network plans, that minimizes costs associated with operating the network, as described above in connection with FIGS. 1A-3.

As further shown in FIG. 5, process 500 may include performing one or more actions based on the identified network plan (block 560). For example, the controller platform (e.g., using computing resource 224, processor 320, memory 330, storage component 340, communication interface 370, and/or the like) may perform one or more actions based on the identified network plan, as described above in connection with FIGS. 1A-3.

Process 500 may include additional implementations, such as any single implementation or any combination of implementations described below and/or in connection with one or more other processes described elsewhere herein.

In some implementations, the controller platform, when performing the one or more actions, may cause the identified potential network plan to be implemented in the network by the plurality of network devices, may provide, to a client device, information indicating the identified potential network plan, and/or the like. In some implementations, the controller platform, when identifying the potential network plan, of the plurality of potential network plans, that minimizes costs associated with operating the network, may determine a plurality of costs associated with the plurality of potential network plans based on the network data, and may identify the potential network plan that minimizes costs associated with operating the network based on the plurality of costs associated with the plurality of potential network plans.

In some implementations, the controller platform, when identifying the potential network plan, of the plurality of potential network plans, that minimizes costs associated with operating the network, may determine a plurality of penalties associated with failures of the plurality of potential network plans in meeting traffic demands of the network, may add the plurality of penalties to the plurality of costs, and may identify the potential network plan that minimizes costs associated with operating the network after adding the plurality of penalties to the plurality of costs.

In some implementations, the constraints may include a particular constraint indicating a failure threshold associated with paths provided through the network by the plurality of network devices and the links, and the controller platform may determine one or more of the plurality of potential network plans that fail to satisfy the particular constraint, may remove the one or more of the plurality of potential network plans from the plurality of potential network plans to generate a subset of the plurality of potential network plans, and may identify the potential network plan from the subset of the plurality of potential network plans.

In some implementations, the controller platform may cause the identified potential network plan to be implemented in the network by the plurality of network devices, may receive additional network data from the network based on causing the identified potential network plan to be implemented in the network by the plurality of network devices, may modify the identified potential network plan based on the additional network data to generate a modified potential network plan, and may cause the modified potential network plan to be implemented in the network by the plurality of network devices.

In some implementations, the controller platform may provide, to a client device, information identifying the plurality of potential network plans, may receive, from the client device, information indicating a selection of the identified potential network plan, and may identify the potential network plan based on the selection.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
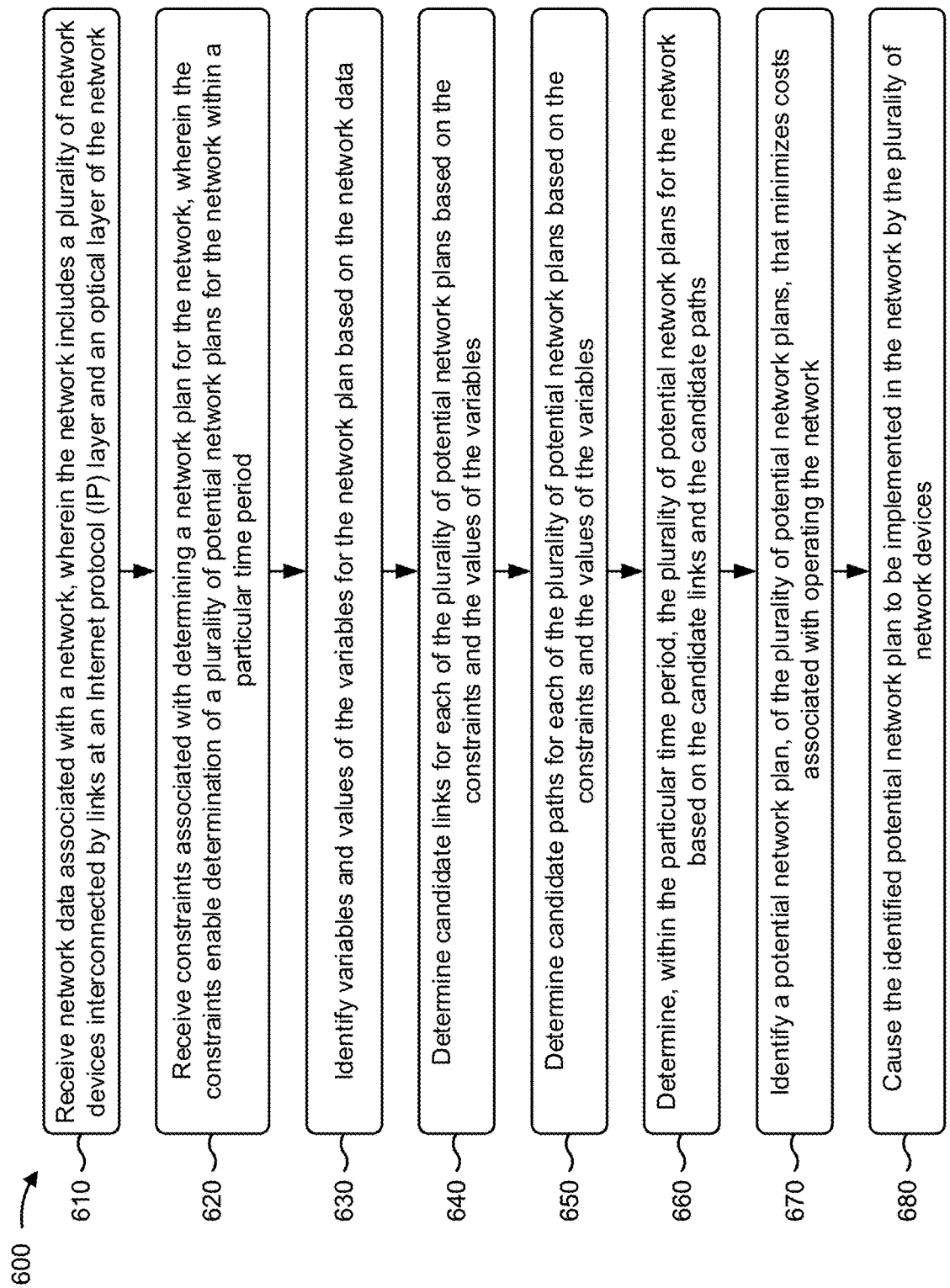

FIG. 6 is a flow chart of an example process 600 for utilizing constraints to determine optimized network plans and to implement an optimized network plan. In some implementations, one or more process blocks of FIG. 6 may be performed by a controller platform (e.g., controller platform 220). In some implementations, one or more process blocks of FIG. 6 may be performed by another device or a group of devices separate from or including the controller platform, such as a client device (e.g., client device 210) and/or a network device (e.g., network device 240).

As shown in FIG. 6, process 600 may include receiving network data associated with a network, wherein the network includes a plurality of network devices interconnected by links at an Internet protocol (IP) layer and an optical layer of the network (block 610). For example, the controller platform (e.g., using computing resource 224, processor 320, communication interface 370, and/or the like) may receive network data associated with a network, as described above in connection with FIGS. 1A-3. In some aspects, the network may include a plurality of network devices interconnected by links at an IP layer and an optical layer of the network.

As further shown in FIG. 6, process 600 may include receiving constraints associated with determining a network plan for the network, wherein the constraints enable determination of a plurality of potential network plans for the network within a particular time period (block 620). For example, the controller platform (e.g., using computing resource 224, processor 320, communication interface 370, and/or the like) may receive constraints associated with determining a network plan for the network, as described above in connection with FIGS. 1A-3. In some aspects, the constraints may enable determination of a plurality of potential network plans for the network within a particular time period.

As further shown in FIG. 6, process 600 may include identifying variables and values of the variables for the network plan based on the network data (block 630). For example, the controller platform (e.g., using computing resource 224, processor 320, memory 330, and/or the like) may identify variables and values of the variables for the network plan based on the network data, as described above in connection with FIGS. 1A-3.

As further shown in FIG. 6, process 600 may include determining candidate links for each of the plurality of potential network plans based on the constraints and the values of the variables (block 640). For example, the controller platform (e.g., using computing resource 224, processor 320, storage component 340, and/or the like) may determine candidate links for each of the plurality of potential network plans based on the constraints and the values of the variables, as described above in connection with FIGS. 1A-3.

As further shown in FIG. 6, process 600 may include determining candidate paths for each of the plurality of potential network plans based on the constraints and the values of the variables (block 650). For example, the controller platform (e.g., using computing resource 224, processor 320, memory 330, and/or the like) may determine candidate paths for each of the plurality of potential network plans based on the constraints and the values of the variables, as described above in connection with FIGS. 1A-3.

As further shown in FIG. 6, process 600 may include determining, within the particular time period, the plurality of potential network plans for the network based on the candidate links and the candidate paths (block 660). For example, the controller platform (e.g., using computing resource 224, processor 320, storage component 340, and/or the like) may determine, within the particular time period, the plurality of potential network plans for the network based on the candidate links and the candidate paths, as described above in connection with FIGS. 1A-3.

As further shown in FIG. 6, process 600 may include identifying a potential network plan, of the plurality of potential network plans, that minimizes costs associated with operating the network (block 670). For example, the controller platform (e.g., using computing resource 224, processor 320, memory 330, and/or the like) may identify a potential network plan, of the plurality of potential network plans, that minimizes costs associated with operating the network, as described above in connection with FIGS. 1A-3.

As further shown in FIG. 6, process 600 may include causing the identified potential network plan to be implemented in the network by the plurality of network devices (block 680). For example, the controller platform (e.g., using computing resource 224, processor 320, memory 330, storage component 340, communication interface 370, and/or the like) may cause the identified potential network plan to be implemented in the network by the plurality of network devices, as described above in connection with FIGS. 1A-3.

Process 600 may include additional implementations, such as any single implementation or any combination of implementations described below and/or in connection with one or more other processes described elsewhere herein.

In some implementations, the constraints may include a constraint indicating a failure threshold associated with paths provided through the network by the plurality of network devices and the links, a constraint indicating capacities of the links, a constraint indicating possible paths for a traffic demand of the network, a constraint indicating no possible paths for the traffic demand, and/or the like.

In some implementations, the controller platform, when determining the plurality of potential network plans for the network, may determine relationships between the values of the variables based on the constraints, may determine implications of the values of the variables on the plurality of potential network plans based on the relationships between the values of the variables, and may determine the plurality of potential network plans for the network based on the implications of the values of the variables.

In some implementations, the controller platform, when determining the plurality of potential network plans for the network, may utilize a consistency model to determine implications of the values of the variables on the plurality of potential network plans, and may determine the plurality of potential network plans for the network based on the implications of the values of the variables. In some implementations, the network may include a packet optical network.

In some implementations, the controller platform, when identifying the potential network plan, of the plurality of potential network plans, that minimizes costs associated with operating the network, may determine a plurality of costs associated with the plurality of potential network plans based on the network data and based on lengths associated with the candidate links, and may identify the potential network plan that minimizes costs associated with operating the network based on the plurality of costs associated with the plurality of potential network plans.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device, network data associated with a network,
        wherein the network includes a plurality of network devices interconnected by links;
    determining, by the device, constraints associated with determining a network plan for the network,
        wherein the constraints at least include a constraint indicating a particular time period for determining a plurality of potential network plans for the network;
    identifying, by the device, one or more variables, and one or more values of the one or more variables, for the network plan based on the network data;
    determining, by the device and within the particular time period, the plurality of potential network plans for the network based on the constraints and the one or more values of the one or more variables;
    identifying, by the device, a potential network plan that minimizes cost associated with operating the network; and
    causing, by the device, the identified potential network plan to be implemented in the network.

2. The method of claim 1, wherein the network data includes data identifying one or more of:
    the plurality of network devices,
    the links interconnecting the plurality of network devices,
    capacities of the plurality of network devices,
    capacities of the links interconnecting the plurality of network devices,
    paths through the network provided by the plurality of network devices,
    sources of the paths through the network,
    destinations of the paths through the network, or
    capacities of the paths through the network.

3. The method of claim 1, wherein the constraints further include one or more of:
    a constraint indicating a failure threshold associated with paths provided through the network by the plurality of network devices and the links, or
    a constraint indicating that a quantity of the plurality of potential network plans is to be determined based on a length of the particular time period.

4. The method of claim 1, wherein identifying variables and values of the variables for the network plan based on the network data comprises:
    utilizing the constraints to select a variable,
    utilizing the constraints to select a value for a variable, or
    selecting a last-selected value in a case where all values of a variable have been selected and eliminated.

5. The method of claim 1, wherein determining the plurality of potential network plans for the network comprises:
    determining relationships between the values of the variables based on the constraints;

determining implications of the values of the variables on the plurality of potential network plans based on the relationships between the values of the variables; and determining the plurality of potential network plans for the network based on the implications of the values of the variables.

6. The method of claim 1, wherein determining the plurality of potential network plans for the network comprises:

utilizing a consistency model to determine implications of the values of the variables on the plurality of potential network plans; and determining the plurality of potential network plans for the network based on the implications of the values of the variables.

7. The method of claim 6, further comprising utilizing the consistency model to generate a partially consistent result.

8. A device, comprising:

one or more memories; and one or more processors, communicatively coupled to the one or more memories, to:

receive network data associated with a network,
wherein the network includes a plurality of network devices interconnected by links at a first layer and a second layer of the network;

determine a plurality of potential network plans for the network based on one or more constraints and one or more values of one or more variables for the potential network plans;

determine one or more of the plurality of potential network plans that fail to satisfy a particular constraint, of the one or more constraints;

generate a subset of the plurality of potential network plans, based on excluding one or more potential network plans, of the plurality of potential network plans, that fail to satisfy the particular constraint;

identify a potential network plan, of the subset of the plurality of potential network plans, that minimizes cost associated with operating the network; and perform one or more actions based on the identified potential network plan.

9. The device of claim 8, wherein the one or more processors, when identifying the potential network plan, of the plurality of potential network plans, that minimizes cost associated with operating the network, are to:

determine a plurality of costs associated with hub links based on associating a first cost with a first hop of the second layer and a second cost with each additional hop of the second layer.

10. The device of claim 8, wherein the one or more processors, when identifying the potential network plan, of the plurality of potential network plans, that minimizes cost associated with operating the network, are to:

determine a plurality of costs associated with the plurality of potential network plans based on the network data; and identify the potential network plan that minimizes cost associated with operating the network based on the plurality of costs associated with the plurality of potential network plans.

11. The device of claim 8, wherein the one or more processors, when identifying the potential network plan, of the plurality of potential network plans, that minimizes cost associated with operating the network, are to:

determine a plurality of penalties associated with failures of the plurality of potential network plans in meeting traffic demands of the network;

add the plurality of penalties to a plurality of costs associated with the plurality of potential network plans; and identify the potential network plan that minimizes cost associated with operating the network after adding the plurality of penalties to the plurality of costs.

12. The device of claim 8, wherein the particular constraint includes at least one of:

a constraint indicating a particular time period associated with determining the network plan for the network, or a constraint indicating a threshold count associated with a traffic demand failure by the network plan.

13. The device of claim 8, wherein the one or more processors are further to:

cause the identified potential network plan to be implemented in the network by the plurality of network devices;

receive additional network data from the network based on causing the identified potential network plan to be implemented in the network by the plurality of network devices;

modify the identified potential network plan based on the additional network data to generate a modified potential network plan; and cause the modified potential network plan to be implemented in the network by the plurality of network devices.

14. The device of claim 8, wherein the one or more processors are further to:

provide, to a client device, information identifying the plurality of potential network plans; and receive, from the client device, information indicating a selection of the identified potential network plan,
wherein the one or more processors, when identifying the potential network plan, are to:
identify the potential network plan based on the selection.

15. A non-transitory computer-readable medium storing instructions, the instructions comprising:

one or more instructions that, when executed by one or more processors, cause the one or more processors to:
receive network data associated with a network,
wherein the network includes a plurality of network devices interconnected by links;

determine a plurality of potential network plans for the network based on candidate links and candidate paths for each of the plurality of potential network plans;

determine one or more penalties associated with one or more failures of the plurality of potential network plans in meeting traffic demands of the network;

identify a potential network plan that minimizes cost and traffic demand failure associated with operating the network, the potential network plan identified from amongst the plurality of potential network plans based at least in part on the one or more penalties; and cause the identified potential network plan to be implemented in the network.

16. The non-transitory computer-readable medium of claim 15, wherein candidate links and candidate paths for each of the plurality of potential network plans are determined based on constraints that include one or more of:

a constraint indicating a failure threshold associated with paths provided through the network by the plurality of network devices and the links, a constraint indicating a particular time period associated with determining the network plan for the network, a constraint indicating a threshold count associated with a traffic demand failure by the network plan, a constraint indicating possible paths for a traffic demand of the network, or a constraint indicating no possible paths for the traffic demand.

17. The non-transitory computer-readable medium of claim 16, wherein the one or more instructions, that cause the one or more processors to determine the plurality of potential network plans for the network, cause the one or more processors to:

determine relationships between values of variables for the potential network plans based on the constraints;

determine implications of the values of the variables on the plurality of potential network plans based on the relationships between the values of the variables; and determine the plurality of potential network plans for the network based in part on the implications of the values of the variables.

18. The non-transitory computer-readable medium of claim 15, wherein the one or more instructions, that cause the one or more processors to determine the plurality of potential network plans for the network, cause the one or more processors to:

utilize a consistency model to determine implications of one or more values of one or more variables for the potential network plans, on the plurality of potential network plans; and determine the plurality of potential network plans for the network based in part on the implications of the one or more values of the one or more variables.

19. The non-transitory computer-readable medium of claim 15, wherein the network includes a packet optical network.

20. The non-transitory computer-readable medium of claim 15, wherein the one or more instructions, that cause the one or more processors to identify the potential network plan, of the plurality of potential network plans, that minimizes cost and traffic demand failure associated with operating the network, cause the one or more processors to:

determine a plurality of costs associated with the plurality of potential network plans based on the network data and based on lengths associated with the candidate links; and identify the potential network plan that minimizes cost and traffic demand failure associated with operating the network based on the plurality of costs associated with the plurality of potential network plans.

* * * * *